United States Patent [19]

Lien et al.

[11] Patent Number: 4,587,276
[45] Date of Patent: May 6, 1986

[54] POLYPHOTOINITIATORS

[75] Inventors: Qcheng S. Lien, S. Windsor, Conn.; Robert W. R. Humphreys, Bergenfield, N.J.

[73] Assignee: Loctite Corporation, Newington, Conn.

[21] Appl. No.: 528,287

[22] Filed: Aug. 31, 1983

Related U.S. Application Data

[63] Continuation-in-part of Ser. No. 505,588, Jun. 20, 1983, Pat. No. 4,477,326.

[51] Int. Cl.$^4$ .......................... C08F 2/46; C08L 51/08
[52] U.S. Cl. ..................................... 522/34; 522/35; 522/136; 522/144; 522/148; 522/149; 522/904; 525/105; 525/479
[58] Field of Search ...................... 204/159.13, 159.15; 556/436; 525/105, 479

[56] References Cited

U.S. PATENT DOCUMENTS 4,273,907 6/1981 Takamizawa et al.
4,391,963 7/1983 Shirahata.
4,477,326 10/1984 Lin .................. 204/159.13

FOREIGN PATENT DOCUMENTS 51-34291 3/1976 Japan.
53-71199 6/1978 Japan.
54-50067 4/1979 Japan.

OTHER PUBLICATIONS

Chemical Abstracts 97: 23997x, 1982.

Primary Examiner—Allan M. Lieberman
Attorney, Agent, or Firm—Walter J. Steinkraus; Eugene F. Miller

[57] ABSTRACT

Novel polymeric photocleavable photoinitiators are prepared by the hydrosilation reaction of an organosilicon hydride grafting agent which has a photoinitiating aromatic-aliphatic ketone derivative of at least one organo group, with a polymer having a plurality of unsaturated olefinic or acetylenic sites in the presence of a hydrosilation catalyst. Preferred polymers are butadiene or alkyl substituted butadiene polymers and copolymers and vinyl functional polyorganosiloxanes. The grafting agents have the formula (hv)—$R^8$—$R^5$—H wherein (hv) is a photoinitiating aromatic-aliphatic ketone group, $R^8$ is selected from alkylene, alkenylene, alkylenoxy and oxy groups, and $R^5$ is selected from

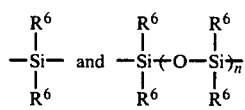

the $R^6$ groups are the same or different organo or halo groups and n is an integer.

29 Claims, No Drawings

POLYPHOTOINITIATORS

This application is a continuation-in-part of co-pending application Ser. No. 505,588, filed June 20, 1983, now U.S. Pat. No. 4,477,326.

BACKGROUND OF THE INVENTION

This invention relates to novel free radical generating photoinitiators which are used for curing polymer compositions such as coatings, adhesives, molding compounds or thermoset structural resins. The invention also encompasses intermediates and processes for making the novel initiators and compositions derived therefrom.

The primary function of a photoinitiator is to generate polymerization initiating radicals when the photoinitiator is irradiated with ultraviolet (UV) light. Photoinitiators are classified into intermolecular H-abstraction and intramolecular photocleavage photoinitiators according to the pathways by which the effective initiating radicals are generated.

The intermolecular H-abstraction photoinitiators include benzophenone and its derivatives such as xanthone, thioxanthone, and 4,4'-bis(N,N'-dimethylamino)-benzophenone, as well as benzil and quinones. These photoinitiators require hydrogen-donors, such as amines, thiols or alcohols for generating radicals which are effective in initiating polymerization. The process of H-abstraction is a bimolecular reaction requiring the encounter of a photoinitiator and a hydrogen-donor by diffusion through the matrix of resin. The intramolecular photoinitiators are decomposed by UV light directly into radicals which are effective in initiating polymerization. This decomposition process is a unimolecular reaction which is inherently more effective than the bimolecular reaction.

An important class of intramolecular photocleavable photoinitiators are aromatic-aliphatic ketone derivatives, including benzoin and its derivatives, 2-phenyl-1-indanone, etc. A more detailed description of aromatic-aliphatic ketone photoinitiators is given in V. McGinniss, "Photoinitiated Polymerization by Aromatic Carbonyl Acid Alkyl-phenyl Ketone Compounds", in *Developments in Polymer Photochemistry*, 3, 1–152 (1982). U.S. Pat. No. 4,308,400 describes a wide variety of photoinitiating aromatic-aliphatic ketones, including ones with siloxy or alkenyl functionality.

Conventional benzoin type photoinitiators decompose into two fragments of radical species upon being excited by UV light. After initiating the polymerization, the fragmented radical species become ends of polymer chains. The architecture of the resin networks, and consequently the properties of the cured resins, are controlled mainly by the composition of crosslinkers (multifunctional monomers) and prepolymers.

Although the photoinitiators exemplified above are soluble and effective in curing organic resins they often have limited solubility in silicones. Consequently their effectiveness in curing silicones is greatly reduced. To overcome this compatibility difficulty, silicone moieties have been chemically bonded with the photoinitiators.

Direct UV-initiated crosslinking of polysiloxane compositions has been reported where the polysiloxane resins include methyl, vinyl, alkylmercapto and/or hydrosilyl functionalities. These systems are all believed to involve a hydrogen abstraction mechanism. These compositions have been used for release coatings and electrically resistive circuit board coatings. References describing such systems include: Canadian Pat. No. 653,301, to Warrick, 12/4/62; U.S. Pat. No. 3,873,499, to Michael et al., 3/25/75; U.S. Pat. No. 4,064,027, to Gant, 12/20/77; U.S. Pat. No. 4,133,939, to Bokerman et al., 1/9/79; and U.S. Pat. No. 4,052,529, to Bokerman et al., 10/4/77.

A Japanese patent publication, Kokai No. 34,291/76 describes the application of benzophenone derivatives, such as 4-dimethylamino-4'-(trimethoxysilylethyl)dimethylsilybenzophenone, in preparing the silicone compatible photoinitiators. The photoinitiators described in this patent are intramolecular H-abstraction type. The curing time for hardening the resin was around 5 minutes.

Another Japanese patent publication, Kokai 71,189/78, describes the application of photoinitiators from the reaction of alkenylsilylbenzophenone and silicones containing siliconhydrides. Those photoinitiators are intermolecular H-abstraction type which required longer than ten minutes curing time.

Japanese patent publications, Kokai 50,067/79 and Kokai Tokkyo Koho JP 82 09,792 (Chemical Abstracts, 97:223997×1982) describe the application of benzoin type photoinitiators attached to the ends of polydimethylsiloxane or to the cyclic siloxanes through an Si—O—C bond. Although these photoinitiators are the intramolecular photocleavage type they are inherently not stable in moisture. The SiOC bond is well known to be hydrolytically unstable and can be decomposed by water to form back silanol and benzoin which has very limited solubility in silicones.

SUMMARY OF THE INVENTION

In accordance with the present invention, there are provided novel polymeric photocleavable photoinitiators. They are prepared by the hydrosilation reaction of an organosilicon hydride grafting agent which has a photoinitiating aromatic-aliphatic ketone derivative as at least one organo group, with a polymer having a plurality of unsaturated olefinic or acetylenic sites in the presence of a hydrosilation catalyst. Pendent vinyl groups are the preferred host polymer hydrosilation sites but internal olefins may also be utilized advantageously.

As used herein the term "silane" refers generally to compounds of the structure:

where the R groups are the same or different organo, halo or hydro substituents.

The term "siloxane" is used herein to designate silicone compounds which include a silicon-oxygen-silicon linkage

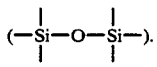

In structural formulas, numbered R groups and other defined symbols (e.g., the letters n, m, x, etc.), once defined will carry the same definition throughout the specification and claims hereof.

The organosilicon hydride grafting agents of the invention may be prepared by hydrosilation of an alkenyl substituted aromatic-aliphatic ketone derivative with a dihydrosilane or siloxane such as $(CH_3)_2SiH_2$ or $[H(CH_3)_2Si]_2O$ in greater than two molar excess. As an alternative synthesis a hydrolyzable organohydrosilane such as $(CH_3)_2ClSiH$ may be used to hydrosilate the alkenyl substituted aromatic-aliphatic ketone and the resulting product hydrolyzed in the presence of a second mole of hydrolyzable organohydrosilane to give a silicon hydride functional siloxane grafting agent. Preferred alkenyl groups have terminal methylene groups, such as vinyl or allyl. A preferred group of allyl-substituted aromatic-aliphatic ketones are the α-allyl benzoin ethers.

The host polymers may advantageously be homopolymers of butadiene or alkyl substituted butadienes such as isoprene or copolymers of such butadienes with other ethylenic monomers such as acrylates, methacrylates, acrylonitrile, etc. Other polymers with olefinic unsaturation may also be utilized as polymers in this invention. Of particular interest are the vinyl functional silicones since benzoin photoinitiators are notoriously incompatible with silicones. Vinyl functional silicones may be made self-curing if photoinitiator moieties are grafted on only some of the vinyl sites or if other photocurable groups are included on the polymer.

In general it is preferred that the unsaturated sites on the host polymer be pendent vinyl groups, rather than internal olefins or double bonds adjacent to strongly electron withdrawing groups because of the milder conditions and greater efficiency of the hydrosilation grafting reaction where pendent vinyl sites are utilized.

Polyphotoinitiators of the present invention are particularly useful for in-situ formation of graft copolymers with free radical polymerizable ethylenic monomers. When mixtures of the inventive polyphotoinitiators with an ethylenic monomer are irradiated with UV light, gel time is significantly faster than for mixtures of ungrafted host polymer and photoinitiators with the same monomers. Additionally, the grafting efficiency between host polymer and the polymerizable monomer is far greater with the inventive polyphotoinitiators than for a simple mixture of host polymer and polyphotoinitiator. These features are especially desirable in adhesives, sealants and coatings.

The hydrosilation reaction may be carried out in a reactive diluent to prepare polyphotoinitiator solutions in which the solvent will polymerize and graft to the photoinitiating polymer upon irradiation with UV light. Methacrylate monomers are useful reactive diluents for such reactions.

DETAILED DESCRIPTION OF THE INVENTION

An aspect of this invention is the novel photoinitiating silicon hydride compounds which are grafted to the host polymer by a hydrosilation reaction. The novel grafting agents may be any silicon hydride functional compound which includes a photocleavable photoinitiating functionality thereon. In particular, the inventive grafting agents are derived from alkynyl or alkenyl substituted aromatic-aliphatic ketone derivatives.

Preferred grafting agents are allyl substituted benzoin derivatives, especially alpha-allyl benzoin ethers. Examples of such compounds are the following structures (1–3), it being understood that the alkenyl group may be incorporated at other locations or in other photoinitiating aromatic-aliphatic ketones without departing from the invention hereof.

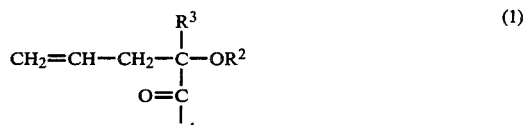

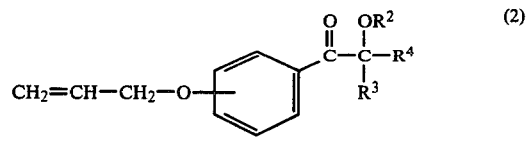

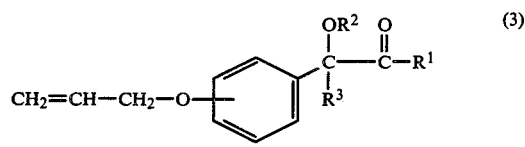

wherein $R^1$ is phenyl or substituted phenyl; $R^2$ is alkyl, substituted alkyl, aryl, substituted aryl, or triorganosilyl; and, $R^3$ and $R^4$ are H, alkyl, substituted alkyl, aryl or substituted aryl, or $R^3$ and $R^4$ together with the carbon atom to which both are attached comprise a cyclic alkyl group. Examples of other aromatic-aliphatic ketones which include or may be modified to include an appropriate alkenyl group are contained in the aforementioned U.S. Pat. No. 4,308,400. When $R^2$ is triorganosilyl the organo groups are preferably substituted or unsubstituted alkyl or aryl groups, most preferably lower alkyls.

The inventive grafting agents are prepared from the alkenyl substituted aromatic-aliphatic ketones by a hydrosilation reaction using a molar excess of a dihydrosilicon compound. The dihydrosilicon compound may be a silane or a siloxane and can be represented by the formula $H-R^5-H$ where $R^5$ is:

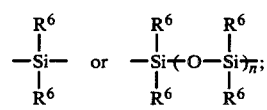

n is an integer; and the $R^6$ groups are the same or different organo or halo groups. Preferably $R^6$ is alkyl, such as dimethyldihydrosilane or tetramethyldihydrodisiloxane.

The preparation of the grafting agents may be represented by the equation for the reaction of $H-R^5-H$ with an allyl substituted aromatic-aliphatic ketone represented generally by the symbol $(hv)-CH_2-CH=CH_2$, the symbol $(hv)$ representing the aromatic-aliphatic ketone moiety.

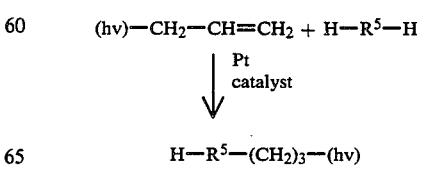

This method of preparation is exemplified in Examples VI and VIII below.

An alternative method of preparation of the siloxane grafting agents represented by formula (4) is to sequentially hydrosilate an alkenyl substituted aromatic-aliphatic ketone with a hydrolyzable hydrosilane such as dimethylchlorohydrosilane, followed by hydrolysis of the resulting product in the presence of additional hydrolyzable hydrosilane. This method is represented by the following equation and is exemplified in Example III.

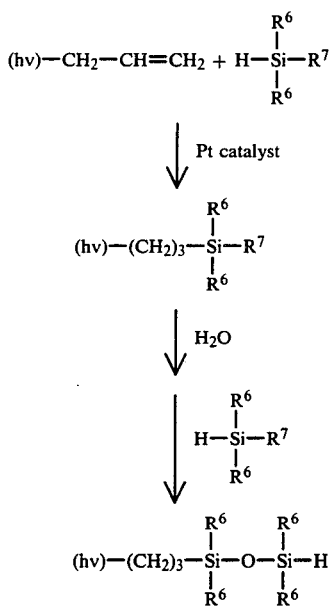

where $R^7$ is a hydrolyzable group such as chloro or methoxyl.

In general the inventive photoinitiator grafting agents are most conveniently prepared from α-allylbenzoin ethers as represented by formula (1) above. When allyl ethers such as those represented by formulas (2) and (3) are hydrosilated, as much as one third of the resulting grafting agent has been observed to have undergone a propene elimination yielding a product which may be represented by formula (5).

$$(hv)\text{---}O\text{---}R^5\text{---}H \qquad (5)$$

Such products, although effective grafting agents, are generally less hydrolytically stable than those represented by the formula (4) above.

As can be seen from the foregoing discussion, the photoinitiator-grafting agents of the invention may be represented by the generalized formula $(hv)\text{---}R^8\text{---}R^5\text{---}H$ where $R^8$ is alkylene, alkyleneoxy or oxy. $R^8$ may also be alkenylene if the grafting agent is prepared from an alkynyl substituted aromatic-aliphatic ketone. In such case, however, the unsaturated sites of the host polymer to which the grafting agent is subsequently added will preferably be alkynyl or pendent vinyl sites.

Although the inventive grafting agents are most conveniently prepared from allylbenzoin ethers, other alkenyl substituted aromatic-aliphatic ketones may be desired for their photoinitiating properties in a particular application. In particular, it has been reported that with some ethylenic monomers, new polymer chains are predominantly initiated by the benzoyl radical fragment of benzoin photoinitiators. Polymeric photoinitiators prepared from grafting agents derived from compounds in which the allyl group is substituted on the benzoyl side, such as those represented by formula (2), may be desirable since the benzoyl fragment will remain attached to the host polymer backbone after irradiation.

Examples 1 and 2 describe the preparation of α-allyl benzoin ethers.

EXAMPLE I

Benzoin ethyl ether (150 g) and t-butanol (750 g) were added into a two liter, three-necked, round-bottomed flask with magnetic stirring in an oil bath and heated to 50° C. to dissolve the benzoin ethyl ether. The solution turned black after the addition of 73.7 g of potassium t-butoxide. Allyl bromide (92.4 g) was added slowly into the stirring solution at 80° C. The reaction was refluxed for 2 hours and allowed to cool down. After evaporation of the t-butanol and filtration of potassium bromide salt the crude product was subjected to distillation at 118±2° C. and 0.05 mm Hg to obtain 158 g of α-allylbenzoin ethyl ether.

EXAMPLE II

Benzoin methyl ether (50 g) and t-butanol (500 g) were added to a 1 liter, 3-neck round bottom flask equipped with magnetic stirrer, and placed in an oil bath at 80° C. To this mixture, 33.7 g of potassium t-butoxide was added and the solution stirred for 15 minutes. Allyl bromide (42.3 g) was added dropwise over a 1 hour period and stirring was continued at 85° C. for 2 more hours followed by cooling to room temperature. After evaporation of t-butanol and filtration of potassium bromide, the product was distilled at 125° C.±2° C. and 0.05 mm Hg to yield 49.2 g of α-allylbenzoin methyl ether which crystallized upon cooling.

Example III describes the preparation of a grafting agent from an α-allylbenzoin ether.

EXAMPLE III

A solution of 0.95 g dimethylchlorosilane in 1.5 ml toluene was added to a 50 ml round-bottomed flask containing 6.5 ml toluene, 2.66 g α-allylbenzoin methyl ether and 0.025 g chloroplatinic acid solution in butyl acetate (2% Pt by wt) at about 73° C. After the exotherm had subsided, the solution was maintained at 73° C. for 45 min. and then allowed to cool to room temperature for 3½ hours.

The reaction mixture was then transferred into a dropping funnel containing 40 ml toluene and the resulting solution added dropwise to a 250 ml round-bottomed flask containing 10 ml water, 1.26 g NaHCO$_3$ and 1 drop pyridine. The reaction mixture was maintained at about 5° C. After evolution of CO$_2$ gas stopped, the toluene layer was separated from the aqueous layer, washed once with water, dried over Na$_2$SO$_4$ for 15 min and filtered into a 100 ml flask equipped with stirrer.

1.19 g pyridine and 1.42 g dimethylchlorosilane in 10 ml toluene were then added to the 100 ml flask at a slow dropping rate, with vigorous stirring. This addition was followed by addition of 1 ml methanol to destroy excess chlorosilane. After filtering off pyridine HCL salt and stripping of solvent with a rotary evaporator, the product was obtained as a light yellow oil. An infrared spectrum of the product revealed a strong SiH stretch at 2116 cm$^{-1}$, strong C=O stretch at 1678 cm$^{-1}$ and strong Si—O—Si stretch at 1076, 1047 and 1030 cm$^{-1}$.

Examples IV and V describe the preparation of compounds represented by formula (2).

EXAMPLE IV p-Allyloxybenzaldehyde-O-trimethylsilylcyanohydrin was prepared in about 52% yield by adding 30.0 g p-allyloxybenzaldehyde, 20.4 g trimethylsilylcyanide and 100 ml acetonitrile to a round bottomed flask equipped with condensor, stirrer and argon gas inlet. Two min. after the addition, 1 g anhydrous stannous chloride was added. The reaction was exothermic. Stirring was continued for 1 hr. after which the reaction was quenched by pouring the solution into a separatory funnel containing 200 ml ice water. The crude product was extracted into methyldichloride, dried over $MgSO_4$ and $Na_2CO_3$ and subjected to vacuum distillation at 114° C. and 0.28 mm Hg.

A moisture free apparatus consisting of a 500 ml 3-neck round-bottomed flask, three dropping funnels, a gas inlet tube and a stirring bar was set up and purged thoroughly with argon. 12.1 g diisopropylamine and 250 ml tetrahydrofuran were added to the flask and the resulting solution cooled to −78° C. 120 ml s-butyl lithium in hexane (1.25M) was added and the mixture stirred at −78° C. for an hour. 26.1 g of p-allyloxybenzaldehyde-O-trimethylsilylcyanohydrin prepared as in the previous paragraph were then added over 30 min. 9.81 g of cyclohexanone was then added and the solution maintained at −78° C. for 1 hr. The color of the reaction mixture, a deep yellow prior to addition of the cyclohexanone, turned colorless with the cyclohexanone addition but then returned to deep yellow when the temperature was allowed to rise to room temperature. After the mixture had reached room temperature, 10 ml $H_2O$ was added. The mixture was then poured into a liter of water and extracted with benzene. The benzene layer was dried over $MgSO_4$ and evaporated to give a product identified by the structure:

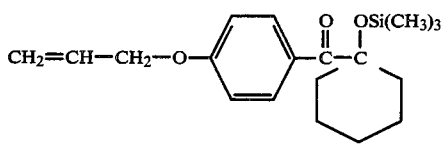

EXAMPLE V

A compound identified by the structure:

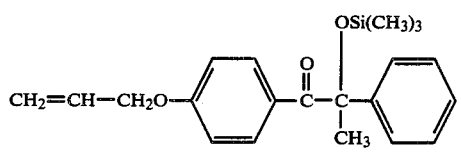

was prepared by the procedure of Example IV except that an equivalent weight of acetophenone was used in place of the cyclohexanone. The product was distilled at 155°–158° C. and about 0.05 mm Hg. The structure was verified by NMR and IR.

Examples VI and VII describe the preparation of grafting agent, from the products of Examples IV and V, respectively.

EXAMPLE VI

A mixture of 1 g of the product of example IV 4.09 g tetramethyldisiloxane and 0.06 g chloroplatininc acid/-butylacetate solution (2% by weight Pt) was placed into a 10 ml round-bottomed flask equipped with a stirring bar, a condenser, and a gas inlet tube. The reaction mixture was refluxed overnight, after which the excess tetramethyldisiloxane was stripped off to obtain the grafting agent product. The infrared spectrum showed strong SiH stretch at 2230 cm$^{-1}$ and no sign of the allyloxy group. Although the products were not further separated Nuclear Magnetic Resonance spectrum indicated the product to be a mixture of (6) and (7).

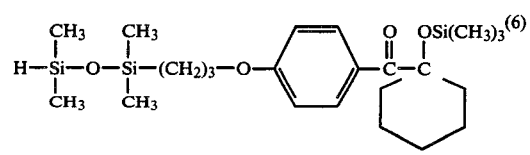

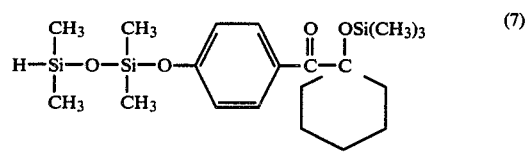

EXAMPLE VII

A grafting agent from the product of Example V was prepared by the procedure of Example VI except that 1.9 g of the product of Example V, 6.7 g tetramethyldisiloxane and an amount of catalyst corresponding to the same mole % as in Example VI were used. The product was shown to be a mixture of (8) and (9).

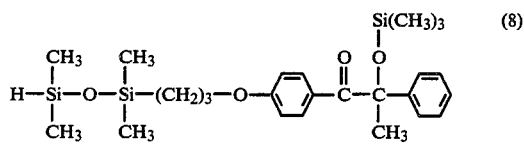

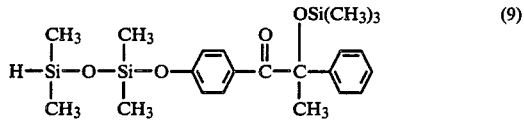

A compound represented by formula (3) and having the structure:

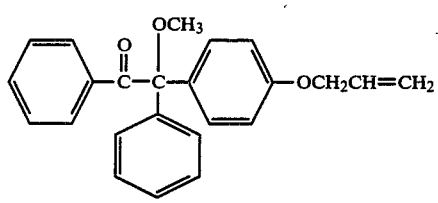

has also been prepared from benzil and p-allyloxyphenylmagnesiumbromide using the well known Grinard reaction followed by etherification with methyl iodide.

The host polymers usable in the present invention may be any polymers with a plurality of olefinically or acetylenically unsaturated sites. Typical polymers are homopolymers and copolymers of butadiene, isoprene and other alkyl substituted butadienes, polysiloxanes or other polymers with pendant vinyl or allyl groups. Unsaturated polyesters such as those derived from maleic, fumaric or unsaturated oil acids may also be usable.

The inventive reaction may be exemplified by the equations for the reaction of a polybutadiene with a grafting agent of formula (4):

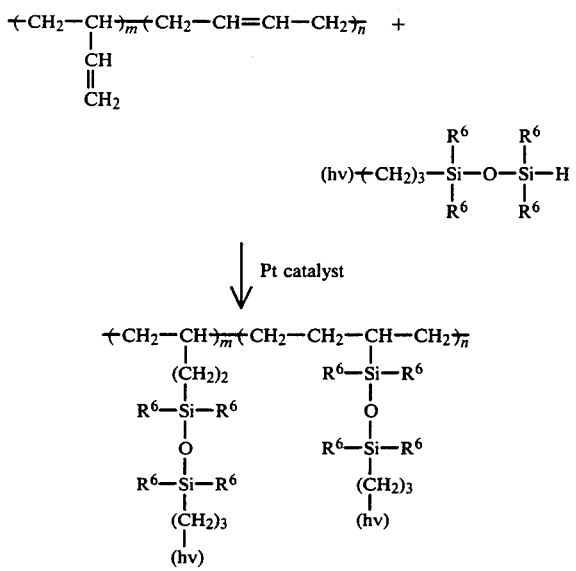

where m and n are integers.

In general it is somewhat easier to add the grafting agents to pendant vinyl groups than to internal double bonds or double bonds with lowered electron density or nearby groups which sterically hinder the bulky photoinitiator graft.

Both the initial grafting agent formation and the polymer grafting reactions are carried out with a catalyst. The hydrosilation catalysts are well-known to those skilled in the art. Examples are platinum, chloroplatinic acid, hydrocarbonplatinum complexes, rhodium complexes, etc. Platinum based catalysts are preferred at levels of between 10 ppm and 500 ppm platinum, more preferably between 50 ppm and 300 ppm.

The reaction temperatures are from room temperature at 250° C. depending on the concentration and the types of catalysts used. The preferred temperatures are from 50° C. to 150° C.

The reactions can be carried out neat or in organic solvents which do not interfere with the hydrosilation. Examples of the solvents are toluene, hexane, tetrahydrofuran, methylene chloride benzene, etc. The reactions were followed easily by the disappearance of the SiH absorption peak at 2200 cm$^{-1}$ of the infrared spectrum. Normally the reactions were complete within three hours.

EXAMPLE VIII

Butarez-NF, a 16,000 MW polybutadiene of very narrow molecular, weight distribution (polydispersity approximately 1.1) containing about 10% pendant vinyl groups (i.e., 10% 1,2- and 90% 1,4-polybutadiene), sold by Phillips Petroleum Co., was hydrosilated with a grafting agent having the structure:

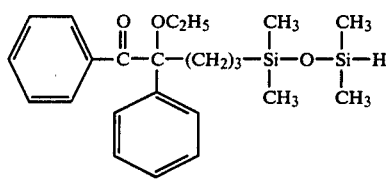

The reaction was carried out in a 250 ml round-bottomed flask equipped with dropping funnel, stirrer, condenser, argon gas inlet tube and thermometer using 26.2 g Buturez-NF, 40 ml toluene and 0.22 g chloroplatinic acid solution. The mixture was heated to about 67° C. after which 10 g of the grafting agent in 10 ml was slowly added through the dropping funnel. The reaction continued to 75° C. until completion, as indicated by disappearance of the SiH stretch in the infrared. Typically the reaction was complete within 4 hrs. The resulting polymer was isolated by stripping off the volitiles with a rotary evaporator.

The polymer product was analyzed by IR and GPC. IR analysis showed that the strong SiH absorption peak at 2200 cm$^{-1}$ of the photoinitiator had disappeared completely. GPC analysis was carried out using both refractive index (RI) and UV (254 nm) detection. With the exception of a low molecular weight impurity, the Butarez-NF polymer did not absorb significantly in the UV at 254 nm. The hydrosilation reaction product, on the other hand, had an intense UV absorption corresponding to a molecular weight of approximately 20,000. This agreed well with the calculated 22,000 molecular weight predicted from adding the appropriate amount of photoinitiator graft to the 16,000 molecular weight Butarez-NF polymer. The UV spectrum of grafted product, obtained by Stop-flow GPC at the product peak maximum, was virtually identical to that of the photoinitiator.

This result proved that the photoinitiator was attached to the polybutadiene backbone. Under the foregoing reaction conditions, additions of the grafting agent of formula (10) to Buturez-NF were easily carried out at 1%, 5% and 10% levels (based on total vinyl functionality). Reaction at a reflux temperature of 110° C. for 5 hours permitted the grafting agent of formula (10) to be added to Butarez-NF at the 15% level. A thin film of this product (1/16") on a glass/slide was irradiated with UV light of an intensity of about 70,000 microwatts/cm$^2$ for 1 min/side to give a cured film.

EXAMPLE IX 1 g of a grafting agent mixture prepared as in Example VI and 50 g Butarez-NF were weighed into a 250 ml, 3-neck flask equipped with thermometer, nitrogen blanket, stirrer and condenser. The reactants were dissolved in 100 ml toluene and the solution heated to reflux (110°–115° C.), 1.2 g of chloroplatinic acid solution (2% Pt in butyl acetate) were added and stirring continued with reflux for 24 hrs. The volatiles were then stripped off on a rotary evaporator at 100° C. and 0.5–0.1 mm Hg for 3 hrs. A ¼" slug of a 50% by weight solution of the product in butyl acrylate completely cured after irradiation for 30 sec/side with UV light of about 70,000 microwatts/cm$^2$ intensity.

EXAMPLE X

This example further demonstrates the addition of a photoinitiator graft to internal olefins.

20 g CB221, a polybutadiene rubber gum of high 1,4-cis-content sold by B. F. Goodrich Co., and 180 ml toluene were added to a 250 ml flask equipped as in Example XIII. The mixture was stirred at 70° C. until the rubber had dissolved and then 1.2 g of the grafting agent of formula (10) were sequentially added. The reaction was complete within 24 hours. The rubber photoinitiator was isolated by pouring the reaction mixture into 400 ml acetone to precipitate the rubber. GPC of the isolated product revealed a large amount of photoinitiator addition to the rubber and very little unreacted photoinitiator.

Styrene/isoprene/styrene block copolymers, such as Kraton 1107, a product of Shell Chemical Co., have also been used as host polymers for the polyphotoinitiators of the present invention.

The mixture of a polyphotoinitiator of the invention with free radical polymerizable unsaturated monomers or prepolymers results in compositions which will polymerize or crosslink upon irradiation with UV light to give a cured product in which a substantial proportion of the polymerized monomer or crosslinked prepolymer is grafted to the polyphotoinitiator backbone. Thus the inventive photoinitiators not only produce faster cures as previously discussed, they also result in novel cured graft copolymer products. Examples of unsaturated monomers which may be compounded with the inventive polyphotoinitiators include esters of acrylic or methacrylic acid, for example methyl acrylate, ethyl acrylate, n- or tert-butyl acrylate, isooctyl acrylate or hydroxyethyl acrylate, methyl or ethyl methacrylate, ethylene glycol diacrylate, neopentyl glycol diacrylate, trimethylolpropane triacrylate, pentaerythritol tetraacrylate or pentaerythritol triacrylate; acrylonitrile, methacrylonitrile, acrylamide, methacrylamide, N-substituted acrylamides and methacrylamides; vinyl esters, such as vinyl acetate, vinyl propionate, vinyl acrylate or vinyl succinate; other vinyl compounds such as vinyl ethers, styrene, alkyl styrenes, halostyrenes, divinyl benzene, vinyl naphthalene, N-vinylpyrrolidone, vinyl chloride or vinylidene chloride; allyl compounds, such as diallyl phthalate, diallyl maleate, triallyl isocyanurate, triallyl phosphate or ethylene glycol diallyl ether and the mixtures of such unsaturated monomers.

Prepolymers which include functional groups derived from the above unsaturated monomers or which include other groups which will react with free radicals to cause crosslinking may also be advantageously compounded with the inventive polyphotoinitiators. The photoinitiators may also be used to cure unsaturated polyester resin compositions. Such compositions typically include a vinyl or allyl compound and diluent, styrene being preferred. The unsaturated polyester components are typically low molecular weight polymers or "oligomers" formed by esterification of at least one unsaturated dicarboxylic acid, such as maleic or fumaric acid and at least one saturated dicarboxylic acid, such as phthalic, succinic, sebacic, adipic or isophthalic acid, with glycols or polyols, such as ethylene glycol, and pentaerythritol. Alkyd resins which contain polyol esters of unsaturated monocarboxylic acids, such as unsaturated vegetable oil acids, may also be curable utilizing the polyphotoinitiators of the invention. It is an especially advantageous feature of the invention that a desired photoinitiator can be made compatible with virtually any composition by grafting the photoinitiator to unsaturated compound or polymer, compatible with the particular composition in accordance with the inventive process.

The difference in double bond reactivities can be exploited to allow preparation of a photoinitiating polymer in a reactive diluent. Methacrylate monomers have substantially lower hydrosilation reactivity because of the adjacent electron withdrawing carbonyl and sterically hindering methyl groups. Use of methacrylate monomers as solvents for the photoinitiator grafting reaction permits preparation of photocuring compositions without separation of the photoinitiating polymer from the reaction solvent. A non-peroxide hydrosilation catalyst must be used.

EXAMPLE XI 13.1 g Butarez-NF, 25 ml cyclohexyl methacrylate, and 0.15 g chloroplatinic acid solution (2% by weight Pt) were placed into a 100 ml 3-neck round-bottom flask equipped with dropping funnel, condenser, stirring bar and thermometer. After the reaction mixture temperature stabilized at 58° C. a solution of grafting agent (10) in 5 ml cyclohexyl methacrylate was dropped slowly into the stirred reaction mixture. After 4 hours IR showed no SiH stretching at 2121 cm$^{-1}$ indicating the reaction was complete.

Example XII demonstrates that the polyphotoinitiators of the present invention when formulated into compositions with free radical polymerizable monomers lead to more efficient graft copolymer formation than do compositions of the same polymer backbone in the presence of an unbound photoinitiator, when both are irradiated under identical conditions.

EXAMPLE XII

Two benzene solutions of methyl methacrylate were prepared. A photo-active polymer, having 10% by repeat unit photoinitiator (43% by wt), prepared from Butarez-NF and grafting agent (6) as in Example VIII was added to one solution. To the other solution, Butarez-NF and an equivalent amount of photoinitiator of structure (11) was added.

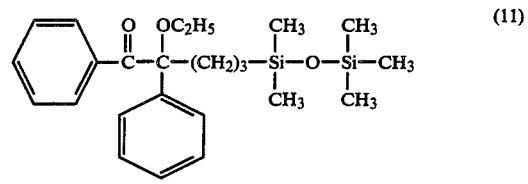

Solution concentrations were such that the reaction mixtures were equimolar in photoinitiator and polybutadiene, whether free or bound. After two hour irradiation through Pyrex with a medium pressure Hg arc lamp, the reaction mixture containing the bound photoinitiator had gelled completely while the other reaction mixture was still liquid. Isolation of the rubber product from the bound photoinitiator system was performed by precipitation with acetone was followed by soxhlet extraction with acetone to give a solid polymer shown to be a graft copolymer of polybutadiene and poly(methyl methacrylate) by IR spectroscopy.

The rubber product isolated by precipitation with acetone from the reaction mixture containing free photoinitiator was also analyzed by IR. The small carbonyl stretch at about 1700 cm$^{-1}$ indicated that only a small amount of grafting had occurred. The conclusion that grafting efficiency was far greater for the polymer-bound photoinitiator system was also supported by the physical state of the irradiated products. The rubber product from the polymer-bound photoinitiator was a hard, glassy solid which was insoluble in a variety of polar and nonpolar organic solvents while that from the free photoinitiator system was a low viscosity, hexane soluble liquid.

A second comparison between polymer-bound and free photoinitiator compositions was made. Table I lists the components of two formulations: Formulation A contains polymer-bound photoinitiator obtained from grafting agent (10) while formulation B contains free photoinitiator (11).

A film of each formulation was placed on a glass slide. After 25 seconds irradiation (approximately 50–75,000 microwatts/in$^2$) the films were examined. Formulation A was cured hard and dry to the touch and remained clear after curing. Formulation B was cheesy and easily broken up. After a few minutes, the film of formulation B began to turn cloudy and finally became completely opaque. This suggested that in the free photoinitiator composition phase separation was occurring because of the incompatibility of polybutadienes and polymethacrylates. In the polyphotoinitiator composition of formula A, the polybutadienes are necessarily cured into the methacrylate networks by virtue of the attached photoinitiator and phase separation cannot occur.

TABLE 1

Comparison of Formulations Containing Polymer-bound Photoinitiator and Free Photoinitiator:[1]

| Component | Formulation A wt. | gms (%) | Formulation B wt. | qms. (%) |
|---|---|---|---|---|
| Butarez-NF | — | | 14.5 | (17.8) |
| Low MW PBD-(hv)[2] | 20.0 | (24.5) | — | — |
| B. F. Goodrich CB221 | — | | 4.3 | (5.2) |
| High MW PBD-(hv)[3] | 5.0 | (6.1) | — | — |
| Photoinitiator formula(11) | — | | 6.2 | (7.6) |
| Isobornyl Methacrylate | 22.5 | (27.6) | 22.5 | (27.6) |
| Cyclohexyl Methacrylate | 30.0 | (36.8) | 30.0 | (36.8) |
| Pentaerythitol Triacrylate | 4.1 | (5.0) | 4.1 | (5.0) |
| | 81.6 | (100) | 81.6 | (100) |

[1]Both formulations are 7.6% by weight photoinitiator
[2]Low MW PBD-(hv) is Butarez-NF reacted with photoinitiator grafting agent (10) 5% of double bonds reacted
[3]High MW PBD-(hv) is B. F. Goodrich C.B.221 reacted with photoinitiator grafting agent (10) 2% of double bonds reacted The grafting of methacrylate to polybutadiene caused by the polymer-bound photoinitiators of the invention also results in a more rapidly curing system. For example, formulation A of Table 1 cured dry to the touch within about 5 seconds whereas formulation B cured dry to the touch only after about 25 seconds and was still cheesy at this point. This is believed to be a result of the multiple chains simultaneously growing from the single high molecular weight backbone, resulting in very rapid build-up of high molecular weight molecules.

In addition to the butadiene-type polymers, another class of host polymers particularly useful in preparation of polyphotoinitiators of the present invention are the silicones. Polyphotoinitiating silicones may be prepared by reacting silicon polymers with pendant vinyl or allyl groups in the same manner as the butadiene-type polymers. The resulting compositions may be self-curing if the silicon backbone resins contain, or are subsequently further polymerized with silanes or siloxanes containing, free radical curable groups. Examples of such groups are acrylate, methacrylate, vinyl, silicon hydride, alkylthiol, styryl, acrylamido, methacrylamido, maleate and itaconate. Silicone polyphotoinitiators of the invention may also be advantageously formulated into curable compositions by blending with conventional alkylmercapto, silicon hydride or vinyl functional silicones.

EXAMPLE XIII

A polydimethylsiloxane gum with 18 mole % vinylmethylsiloxane units (100,000 mol. wt.) was converted to a polyphotoinitiator of the invention by hydrosilation of 50 g of the gum in 100 ml of toluene using a 250 ml flask equipped as in the previous examples, 0.995 g of the grafting agent of formula (10) and 1.3 g chloroplatinic acid solution (2% Pt). The reaction was conducted at 120° C. for 2 hrs. The product was stripped under vacuum as in the previous examples, yielding a dark viscious liquid. When cast as a thin film on a microscope slide and irradiated with UV light of about 70,000 microwatts/cm$^2$ for 1 min/side, a cured film resulted which did not display any opacity even after being placed in a freezer at −45° C. for 1 hr.

Because of the ease of equilibration polymerization of hydrolyzable silanes and low molecular weight linear or cyclic siloxanes, an alternative synthesis of the silicon polyphotoinitiators of the invention is the hydrosilation of a hydrolyzable vinyl silane monomer grafting agent of the invention with subsequent polymerization or copolymerization of the product to form the desired siloxane backbone with attached photoinitiator. Such polymerization techniques are within the skill of practitioners skilled in polysiloxane synthesis.

From the foregoing it can be seen that in addition to the specific examples, many further variations within the skill of those practicing in the art may be employed without departing from the invention hereof which is set forth in the following claims.

We claim:

1. A polyphotoinitiator comprising the hydrosilation reaction product of a host polymer having olefinic or acetylenic unsaturation with at least one grafting agent represented by the formula

(hv)—R$^8$—R$^5$—H wherein (hv) is a photoinitiating aromatic-aliphatic ketone group, R$^5$ is selected from

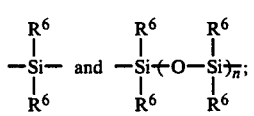

R$^6$ are the same or different organo or halo groups; n is an integer; and R$^8$ is selected from alkylene, alkenylene, alkyleneoxy and oxy groups.

2. A polyphotoinitiator as in claim 1 wherein the host polymer is selected from the group consisting of homopolymers and copolymers of butadiene or alkyl substituted butadienes; polyorganosiloxanes having pendant vinyl or allyl groups and unsaturated polyesters.

3. A polyphotoinitiator as in claim 1 comprising the said reaction product of a said host polymer and a mixture of said grafting agent compounds, said mixture comprising at least one grafting agent in which $R^8$ is oxy.

4. A polyphotoinitiator comprising a polymeric backbone with a plurality of photoinitiating groups pendently attached thereto through intermediate alkylene or alkenylene groups, the photoinitiating groups having the structure;

$$(hv)-R^8-R^5-$$

wherein (hv) is a photoinitiating aromatic-aliphatic ketone group, $R^5$ is selected from

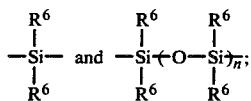

$R^6$ are the same or different organo of halo groups; n is an integer; and $R^8$ is selected from alkylene, alkenylene, alkyleneoxy and oxy groups.

5. A polyphotoinitiator as in claim 4 wherein (hv) is represented by one of formulas (a) (b) or (c):

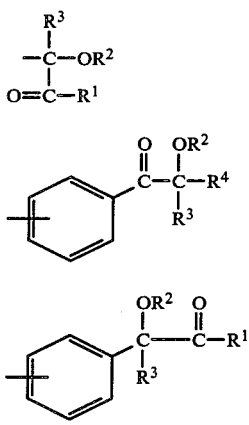

wherein $R^1$ is phenyl or substituted phenyl; $R^2$ is alkyl, substituted alkyl, aryl, substituted aryl or triorganosilyl; and $R^3$ and $R^4$ are H, alkyl, substituted alkyl, aryl or substituted aryl, or, $R^3$ and $R^4$ together with the carbon atom to which both are attached comprise a cyclic alkyl group.

6. A polyphotoinitiator as in claim 5 wherein (hv) is as defined by formula (a), $R^2$ is alkyl and $R^3$ is phenyl or substituted phenyl.

7. A polyphotoinitiator as defined in claim 4 further having a plurality of photocurable groups on the polymer backbone.

8. A polyphotoinitiator as defined in claim 7 wherein the photocurable groups are selected from acrylate, methacrylate, vinyl, silicon hydride, alkylthiol, styryl, acrylamido, methacrylamido, maleate and itaconate.

9. A polyphotoinitiator as defined in claim 1 in a composition, said composition further comprising at least one free radical curable compound.

10. A composition as in claim 9 wherein said curable compound is selected from the group consisting of esters of acrylic and methacrylic acid, acrylonitrile, methacrylonitrile, acrylamide, methacrylamide, N-subsituted acrylamides and methacrylamides; vinyl esters, styrene, alkylstyrenes, halostyrenes, divinylbenzene, vinylnaphthalene, N-vinylpyrrolidone, vinyl chloride, vinylidene chloride, diallyl phthalate, diallyl maleate, triallyl isocyanurate, triallyl phosphate and ethylene glycol diallyl ether.

11. A composition as in claim 9 wherein said curable compound is selected from methyl methacrylate, cyclohexyl methacrylate, isobornyl methacrylate, methyl acrylate, ethyl acrylate, n- or tert-butyl acrylate, isooctyl acrylate, hydroxyethyl acrylate, ethyl methacrylate, ethylene glycol diacrylate, neopentyl glycol diacrylate, trimethylolpropane triacrylate, pentaerythritol tetraacrylate, pentaerythritol triacrylate and mixtures thereof.

12. A method of preparing a polyphotoinitiator comprising the reacting of a host polymer having olefinic or acetylenic unsaturation with at least one grafting agent represented by the formula H—$R^5$—$R^8$—(hv), wherein (hv) is a photoinitiating aromatic-aliphatic ketone group; $R^5$ is a group selected from

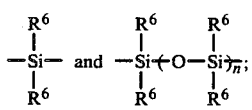

$R^6$ are the same of different organo or halogroups; n is an integer; and $R^8$ is selected from alkylene, alkenylene, alkyleneoxy and oxy groups, said reaction conducted in the presence of a hydrosilation catalyst.

13. A method as in claim 12 wherein the hydrosilation catalyst is a Platinium based catalyst.

14. A method as in claim 13 wherein the catalyst is chloroplatinic acid.

15. A method as in claim 12 wherein the host polymer is selected from the group consisting of homopolymers and copolymers of butadiene or alkyl substituted butadienes; polyorganosiloxanes having pendant vinyl or allyl groups; and unsaturated polyesters.

16. A method as in claim 15 wherein the host polymer is a homopolymer or copolymer of butadiene or an alkyl substituted butadiene and said grafting agent is reacted therewith in amount which does not exceed the number of equivalents of pendant vinyl groups present in the host polymer.

17. A method as in claim 12 wherein (hv) is selected from the groups represented by formulas (a) (b) or (c):

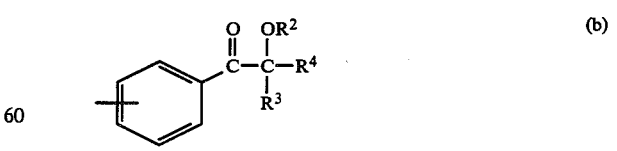

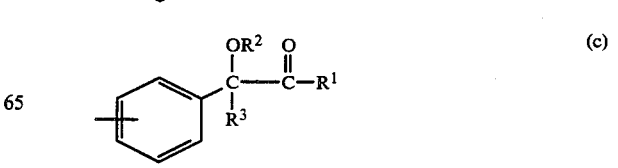

wherein $R^1$ is phenyl or substituted phenyl; $R^2$ is alkyl, substituted alkyl, aryl, substituted aryl or trimethylsilyl; and $R^3$ and $R^4$ are H, alkyl, substituted alkyl, aryl or substituted aryl, or $R^3$ and $R^4$ together with the carbon atom to which both are attached comprise a cyclic alkyl group.

18. A method as in claim 12 in which said grafting agent is prepared by the hydrosilation of a compound having the formula:

$$CH_2=CH-CH_2-(hv)$$

with a dihydrosilicon compound selected from:

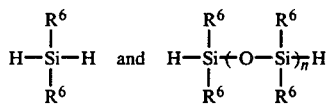

19. A method as in claim 13 wherein the said hydrosilation reaction is conducted in a methacrylate ester diluent.

20. A method of preparing a graft copolymer comprising irradiating a polyphotoinitiator composition with UV light, the polyphotoinitiator composition comprising a mixture of an ethylenically unsaturated monomer and a polyphotoinitiator, the polyphotoinitiator comprising a polymeric backbone with a plurality of photoinitiating groups pendently attached thereto, the photoinitiating group having the structure:

$$(hv)-R^8-R^5-$$

wherein (hv) is a photoinitiating aromatic-aliphatic ketone group; $R^5$ is selected from

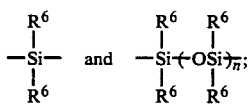

n is an integer; $R^6$ are the same or different organo or halo groups; and $R^8$ is alkylene, alkenylene, alkyleneoxy or oxy.

21. A method as in claim 12 wherein said grafting agent is prepared by the hydrosilation of a compound having the formula:

$$(hv)-CH_2CH=CH_2 \quad (A)$$

with a compound of the formula:

where $R^7$ is a hydrolyzable group, hydrolysis of the $R^7$ group to give the corresponding silanol and condensation of the resulting product with another compound of formula (B).

22. A polyphotoinitiator as in claim 2 wherein the host polymer is selected from homopolymers and copolymers of butadiene or alkyl substituted butadienes.

23. A polyphotoinitiator as in claim 22 wherein the host polymer is polybutadiene.

24. A composition comprising a photoinitiator as n claim 22 and a free radically cureable compound.

25. A composition as in claim 24 wherein the cureable compound is an ester of acrylic or methacrylic acid.

26. A polyphotoinitiator as in claim 4 wherein $R^5$ is

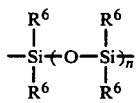

and n is 1.

27. A composition as in claim 9 wherein $R^5$ of the polyphotoinitiator is

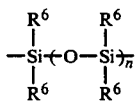

and n is 1.

28. A method as in claim 12 wherein $R^5$ is

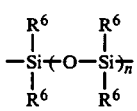

and n is 1.

29. A method as in claim 20 wherein $R^5$ is

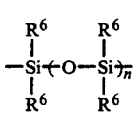

and n is 1.

* * * * *